Sept. 28, 1954  L. M. MACKEY  2,689,967
ADJUSTABLE BROOM HEAD AND HANDLE
Filed Feb. 19, 1952
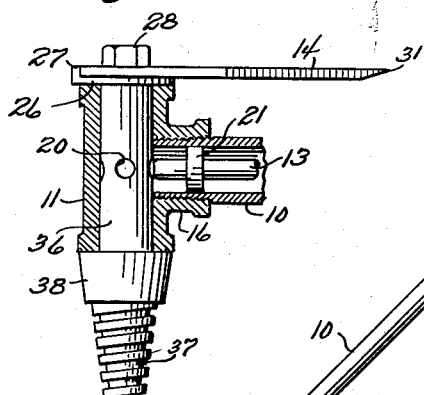
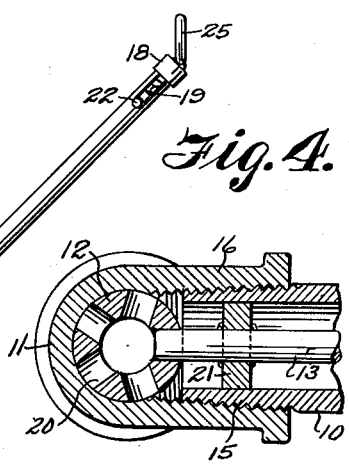
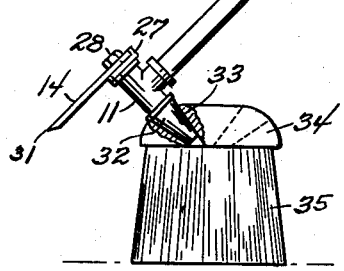
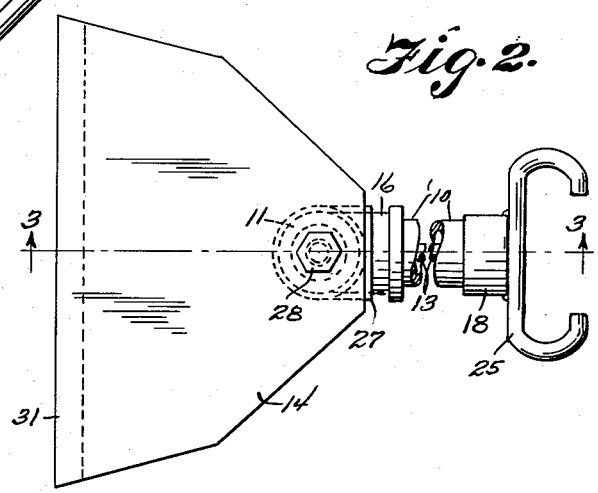
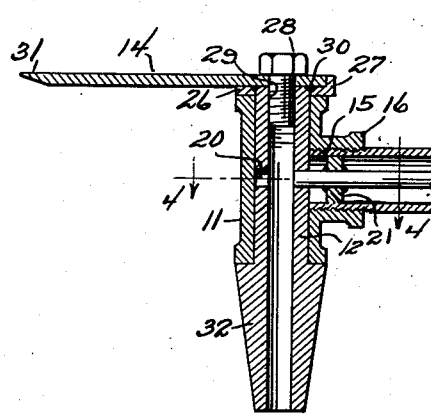
INVENTOR.
Lawrence M. Mackey
BY Victor J. Evans & Co.
ATTORNEYS Patented Sept. 28, 1954

2,689,967

UNITED STATES PATENT OFFICE 2,689,967

ADJUSTABLE BROOM HEAD AND HANDLE

Lawrence M. Mackey, Longview, Wash.

Application February 19, 1952, Serial No. 272,301

3 Claims. (Cl. 15—172)

This invention relates to industrial brooms of the type adapted to be pushed or pulled, and in particular a tubular handle having a swivel joint whereby the broom may be set at different angles in relation to the handle.

The purpose of this invention is to provide means for adjusting the position of a broom in relation to a handle for facilitating cleaning in close quarters such as narrow aisles, and in corners and the like.

Various methods have been provided for connecting broom handles to brushes and brushes have been positioned at different angles in relation to a handle. However, to facilitate cleaning in close quarters this invention contemplates a tubular broom handle having a swivel head with a latch for holding the head in different positions in relation to the handle.

The object of this invention is to provide an improved swivel mounting for industrial broom handles whereby the position of a broom carried by the handle is adjustable from the upper end of the handle.

Another object of the invention is to provide a handle for industrial brooms and the like in which the handle is adapted to be used with conventional brooms now on the market.

A further object of the invention is to provide a tubular handle for industrial brooms which is of a simple and economical construction.

With these and other objects and advantages in view the invention embodies an elongated tubular handle having a fitting providing a bearing for a spindle on one end with a latch device extended through the handle for retaining the spindle in an adjusted position, with a frustoconical shaped section on the end of the spindle for retaining the handle in openings in the back of a broom.

Other features and advantages of the invention will appear from the following description taken in connection with the drawings wherein:

Figure 1 is a side elevational view illustrating the improved tubular handle and showing the handle in an opening in the back of a broom, the back of the broom being broken away and shown partly in section.

Figure 2 is a plan view of the industrial broom handle showing a scraper blade mounted on the fitting or head and showing an open hook or ring at the opposite end of the handle, part of the handle being broken away.

Figure 3 is a longitudinal section through the handle taken on line 3—3 of Figure 2, also with parts broken away.

Figure 4 is a sectional plan taken on line 4—4 of Figure 3 showing the connection between the handle and the fitting or head.

Figure 5 is a vertical section through a fitting or head, similar to the one shown in Figure 3 but having a threaded spindle, with parts broken away showing the spindle in elevation and showing a scraper blade on the upper end with the blade turned through an angle of 180 degrees.

Referring now to the drawing wherein like reference characters denote corresponding parts the improved industrial broom handle of this invention includes a tubular handle 10, a fitting 11 providing a head, a spindle 12 journaled in the fitting 11, a latch bar 13 and a scraper 14.

The tube 10 is formed as illustrated in Figures 1 and 3, having a threaded lower end 15, which is threaded into a side connection 16 of the fittings 11, a threaded upper end 17 on which a cap 18 is threaded, and a slot 19 which, with the parts as shown in Figure 3, is positioned in the under surface and extends through the end of the tube.

The fitting 11 is formed with a T and the T is bored on the longitudinal axis providing a bearing for the spindle 12. The spindle 12 is provided with a plurality of radially disposed openings 20, the openings being positioned to receive the end of the latch bar 13 that extends through the tube 10 and that is provided with bearing washers 21, which center the bar in the tube, and a pin 22 which forms a trigger, and which extends through the slot 19. The upper end of the tube 10 is provided with a spring 23, one end of which is located on the end of the bar 13 and the opposite end of which is positioned over a ball 24 on the inner surface of the cap 18.

The outer surface of the cap 18 is provided with an angularly disposed open ring or hook 25 which provides a handle.

With the parts arranged in this manner the latch bar 13 is withdrawn by the trigger 22 whereby the spindle 12 may be rotated to adjust the angular position of the broom in relation to the handle and with the broom in the desired position the trigger 22 is released whereby the spring 23 snaps the bar 13 into one of the openings 20 of the spindle.

The upper end of the spindle is provided with a plate 26 having a flange 27 on one edge and a scraper blade 14 is held against the mounting plate with a cap screw 28 that is threaded into an opening 29 in the upper end of the spindle. With the parts in position the mounting plate 26 may be secured to the end of the spindle by welding, as indicated at the point 30 or by other suitable means. The scraper is provided with a beveled scraping edge 31 and the sharp edge of the scraper may be extended upwardly as shown in Figure 1 or the scraper may be turned around whereby the sharp edge extends over the handle as shown in Figure 5.

In the design illustrated in Figures 1 and 3, the lower end of the spindle 12 is provided with a frusto-conical shaped section 32 that holds by friction in a correspondingly shaped opening 33 of a broom head 34 from which bristles 35 extend, whereby the broom head or back is frictionally mounted on the handle.

In the design shown in Figure 5, the frusto-conical shaped section of the spindle which in Figure 5 is indicated by the numeral 38, is provided with threads 37 with which the spindle may be threaded into an opening in a back of a broom. The spindle 36 is provided with a frusto-conical shaped section 38 at the base of the threads. In this design tube 10, latch bar 13, fitting 11 and scraper 14 are the same as illustrated in Figures 1 and 3.

With the handle as illustrated in Figures 1 and 3 or as in Figure 5 the broom and scraper are adjustably mounted on the lower end of a broom handle and the broom may readily be adjusted to different angles in relation to the handle and the scraper turned to an extended or retracted position, as may be desired.

It will be understood that other modifications may be made in the design and arrangement of the parts without departing from the spirit of the invention.

What is claimed is:

1. The combination of a broom handle for a broom head having frusto-conical shaped openings therein extending at an acute angle to a horizontal plane passing through the broom head comprising an elongated tube, a head carried by one end of the tube, a spindle having radially disposed openings therein journaled in the tube head and having an end extended from one end of the tube head to be inserted into one of the openings in the broom head for attaching the broom head directly to the spindle at an acute angle to the horizontal plane passing through the broom head, and a trigger actuated latch bar extended through the tube and positioned to extend into one of said openings of the spindle for holding the broom head on said spindle in adjusted positions in relation to the tube.

2. In the combination as described in claim 1 in which a mounting plate is provided on one end of the spindle and a cap screw is threaded into the end of the spindle on which the mounting plate is positioned for clamping objects to the end of the spindle.

3. In the combination as described in claim 1, wherein the handle is provided with resilient means for urging the latch bar toward the spindle.

References Cited in the file of this patent

UNITED STATES PATENTS

| Number | Name | Date |
|---|---|---|
| 612,491 | Eck | Oct. 18, 1898 |
| 1,651,251 | Calkins | Nov. 29, 1927 |
| 1,797,614 | Lazzarini | Mar. 24, 1931 |
| 1,989,921 | Goddard | Feb. 5, 1935 |
| 2,002,320 | Jones | May 21, 1935 |
| 2,032,664 | Raptis | Mar. 3, 1936 |